United States Patent [19]

Bohnsack et al.

[11] Patent Number: 4,968,431
[45] Date of Patent: Nov. 6, 1990

[54] PROCESS FOR TREATING COOLING WATER

[75] Inventors: Gerhard Bohnsack, Leverkusen; Roland Kleinstück, Bergisch Gladbach, both of Fed. Rep. of Germany

[73] Assignee: Bayer Aktiengesellschaft, Leverkusen, Fed. Rep. of Germany

[21] Appl. No.: 414,152

[22] Filed: Sep. 28, 1989

[30] Foreign Application Priority Data

Sep. 29, 1988 [DE] Fed. Rep. of Germany ....... 3832980

[51] Int. Cl.⁵ .............................................. C02F 1/42
[52] U.S. Cl. .................................... 210/669; 210/699; 210/701; 210/712; 210/723
[58] Field of Search ................ 210/667, 669, 696–701, 210/702, 712, 720, 723–728, 913, 167

[56] References Cited

U.S. PATENT DOCUMENTS

| | | | |
|---|---|---|---|
| 3,575,853 | 4/1971 | Gaughan et al. | 210/720 |
| 3,805,880 | 4/1974 | Lawlar | 165/1 |
| 3,836,461 | 9/1974 | Whitehead et al. | 210/712 |
| 4,209,398 | 6/1980 | Ii et al. | 210/701 |
| 4,276,180 | 6/1981 | Matson | 210/696 |
| 4,532,045 | 7/1985 | Littmann | 210/167 |

FOREIGN PATENT DOCUMENTS 2118698 7/1972 France .

*Primary Examiner*—Peter Hruskoci
*Attorney, Agent, or Firm*—Sprung Horn Kramer & Woods

[57] ABSTRACT

A process for the treatment of cooling waters, particularly in thermal power stations, without or—optionally—with partial acid decarbonization of the make up water, the improvement wherein the make up water is mechanically coarse-clarified and the hardness is then stabilized with scale inhibitors. The scale inhibitors are then removed from the blow down and are optionally recovered.

5 Claims, No Drawings

PROCESS FOR TREATING COOLING WATER

This invention relates to a process for treating cooling water, particularly for thermal power stations.

The large amounts of waste heat accumulating in thermal power stations are normally dissipated by cooling with water. Wherever sufficient water is available, once-through cooling—with or without an added cooling tower—is the most economic way of cooling. However, in places where such conditions do not prevail, circulation cooling systems using evaporation cooling have to be installed.

In relatively large power stations, surface water is used as make up water for open recirculating cooling systems, having to be mechanically coarse-clarified beforehand According to the prior art, the mechanical purification is followed by decarbonization.

In the most widely used process of lime softening, which is based on the addition of milk of lime or lime water, the concentration of calcium and hydrogen carbonate ions in the added water is reduced:

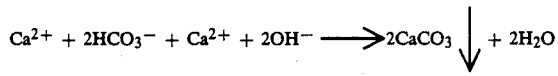

in the make up water from lime.

The object of this decarbonization is to reduce supersaturation with calcium carbonate in the cooling water which occurs in the cooling tower through concentration and the removal of $CO_2$ and results in deposits of calcium carbonate, for example on heat exchanger tubes. A detailed account of these correlations and of softening processes can be found in the book entitled "Kühlwasser (Cooling Water)" by Hans-Dietrich Held, revised by G. Bohnsack, 3rd Edition, Vulkan-Verlag, Essen 1984, cf. in particular Chapter 1 "Verfahren und Systeme der Wasserkühlung (Water Cooling Processes and Systems)", Chapter 2.3 "Bildung von Ablagerungen (Formation of Deposits)" and Chapter 3.3 "Entcarbonisierungsverfahren (Decarbonization Processes)".

The disadvantages of hitherto known and practised processes for lime softening of the make up waters lie in the large quantities of calcium carbonate sludges accumulating (around 20,000 to 30,000 t/a per 1000 MW coal-fired power station), in the large amount of lime to be handled and in the large volume of make up water to be softened. This leads to high investment and operating costs of the plants used for softening of make up water. These disadvantages are accepted because the content of calcium and hydrogen carbonate ions in the make up water can thus be reduced to low levels, simplifying the stabilization of hardness in the circuit water. For example, adequate scale inhibition can be achieved by using phosphonates in concentrations of as low as <1 mg/l.

In another softening, respectively decarbonization process, the carbonate hardness is converted into non-carbonate hardness by addition of acid (generally sulfuric acid, occasionally hydrochloric acid):

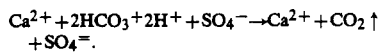

The hydrogen carbonate ions are converted via carbonic acid into carbon dioxide which is removed from the water.

Apart from the need to handle large amounts of acid, a major disadvantage of this decarbonization process is that, as hydrogen carbonate ions are removed, the content of sulfate ions (or, where hydrochloric acid is used, the content of chloride ions) increases by the equivalent concentration.

Now, the object of the present invention is to provide a simpler and less expensive process which does not harm the environment.

The present invention relates to a process for the treatment of cooling waters, particularly in thermal power stations, without or—optionally—with partial acid decarbonization of the make up water, characterized in that the make up water is mechanically coarse-clarified, the carbonate hardness is then stabilized with scale inhibitors, the scale inhibitors are removed from the blow down and are optionally recovered.

After the mechanical clarification, the make up water is added to the cooling circuit without softening respectively decarbonization. The water hardness is stabilized by phosphonates, phosphonocarboxylic acids, polycarboxylic acids. The blow down water is treated to remove the scale inhibitor. Possible methods for treating the blow down are flocculation/precipitation with iron or aluminum salts, adsorption on ion exchangers.

Advantages of the process according to the invention over the treatment of make up water by lime softening are:

The volumes to be treated are considerably smaller amounting to 33% of the make up water volume where the cooling water has a concentration value of 3. The precipitant used, for example iron(III) chloride solution, is very much smaller in volume and, in addition, more convenient to handle than hydrated lime. The quantity of solids deposited compared with lime softening is <5%.

The advantages of the new process over acid decarbonization are that the handling of large amounts of acid and the unwanted increase in the sulfate contents of the waters are completely avoided or, in the case of partial decarbonization, greatly reduced.

The removal of the scale inhibitor from the blow down may be ecologically desirable. In addition, the scale inhibitor may thus be recovered and reused. Methods for recovering the scale inhibitor are; in the case of adsorption on ion exchangers, elution with sodium hydroxide/sodium chloride.

Scale inhibitors from the following classes of substances may be used in the process according to the invention: phosphonates, such as for example 1-hydroxyethane-1,1-diphosphonic acid, amino-tris-methylene phosphonic acid; phosphonocarboxylic acids such as, for example, 2-phosphonobutane-1,2,4-tricarboxylic acid (PBTC); polycarboxylic acids, such as for example polymaleic acid, polyacrylic acids; copolymers containing acrylic and/or maleic acid units and combinations of substances from one or more of these classes. PBTC would appear to be particularly suitable by virtue of its outstanding effectiveness in waters heavily supersaturated with calcium carbonate and its high chemical stability (even to highly oxidizing biocides, such as chlorine for example).

The advantages of the new process are demonstrated by the following examples:

The calculations were based on two thermal power stations each generating 1000 MW electricity, namely:
(a) a conventional coal-fired power station with an efficiency of 40% and (b) a nuclear power station with an efficiency of 33%. The volume of water to be evaporated for heat dissipation through the cooling tower is approximately 0.04 m³/sec. (=12,000,000 m³/a for 350 working days) for (a) and approximately 0.63 m³/sec (=19,000,000 m³/a for 350 working days) for (b).

The concentration of the make up water in the cooling system is defined by the cycles of concentration (C):

$$C = 1 + \frac{Q_V}{Q_B} = \frac{Q_M}{Q_B}, \quad Q_B + Q_V = Q_M$$

$Q_V$ = evaporation volume in m³/unit time $Q_B$ = blow down in m³/unit time $Q_M$ = make up in m³/unit time.

A typical cycle of concentration value is approximately 3.

The additives are added in quantities of from 1 mg/l to 10 mg/l water and preferably in quantities of from 2 mg/l to 5 mg/l. These figures are all based on active-substance contents.

The calculations were based on the following typical water qualities:

| Type 1 | $Ca^{2+} + Mg^{2+}$ | 3.2 mmole/l |
|---|---|---|
|  | ($Ca^{2+}$ | 2.5 mmole/l) |
|  | $K_{S\,4.3}$ | 2.9 mmole/l |
|  | $SO_4^=$ | 130 mg/l |
|  | $Cl^-$ | 180 mg/l |
| Type 2 | $Ca^{2+} + Mg^{2+}$ | 2.0 mmole/l |
|  | ($Ca^{2+}$ | 1.5 mmole/l) |
|  | $K_{S\,4.3}$ | 2.9 mmole/l |
|  | $SO_4^=$ | 50 mg/l |
|  | $Cl^-$ | 100 mg/l. |

In lime softening, 1.2 mmole/l $Ca(OH)_2$ (=89 mg/l) is needed for both waters and 2.4 mmole/l calcium carbonate (240 mg/l solids) is precipitated. The composition of the softened waters is as follows:

| Type 1 | $Ca^{2+}$ | 1.3 mmole/l |
|---|---|---|
|  | $K_{S\,4.3}$ | 0.5 mmole/l |
| Type 2 | $Ca^{2+}$ | 0.3 mmole/l |
|  | $K_{S\,4.3}$ | 0.5 mmole/l. |

The sulfate and chloride contents are not affected by the lime softening.

The scale inhibitor concentrations required for scale inhibition are roughly estimated on the basis of the composition of the circulating waters, the use of pBTC being taken as an example.

A more accurate dosage also cannot be derived from the calcium concentration and the $K_{S\,4.3}$ value because a considerably larger number of factors, such as pH values, temperatures, flow conditions, resistance times and many more, has to b®taken into account. The often necessary use of other cooling water additives, such as for example dispersants, microbicides, corrosion inhibitors, was not taken into consideration either.

The addition of 1 mmole/l sulfuric acid (=98 mg/l) to the make up water for partial decarbonization was assumed for a cooling circuit using water of type 2, C 5, as the make up water.

The precipitation of PBTC by iron chloride solution was based on a molar ratio of Fe to PBTC of 8:1.

| | | Water Type 1 | | | |
|---|---|---|---|---|---|
| | | Cycles of concentration | | | |
| | | 2 | | 3 | |
| | | Coal-fired power station | nuclear power station | Coal-fired power station | nuclear power station |
| I | with lime softening (prior art) | | | | |
| | Make up water volume | 24 mil. m³/a | 38 mil. m³/a | 18 mil. m³/a | 28.5 mil. m³/a |
| | $Ca(OH)_2$ demand | 2,100 t/a | 3,400 t/a | 1,600 t/a | 2,500 t/a |
| | Accumulation of $CaCO_3$ solids | 5,800 t/a | 9,100 t/a | 4,300 t/a | 6,800 t/a |
| | Cooling water: Content of: | | | | |
| | $Ca^{2+}$ | 2.6 mmole/l | | 3.9 mmole/l | |
| | $K_{S\,4.3}$ | 1.0 mmole/l | | 1.5 mmole/l | |
| | PBTC | 0.5 mmole/l | | 1.0 mg/l | |
| | load PBTC | 6 t/a | 9.5 t/a | 6 t/a | 9.5 t/a |
| II | with treatment of the blow down (invention) | | | | |
| | blow down volume | 12 mil. m³/a | 19 mil. m³/a | 6 mil. m³/a | 9.5 mil. m³/a |
| | Cooling water, content of: | | | | |
| | $Ca^{2+}$ | 5 mmole/l | | 7.5 mmole/l | |
| | $K_{S\,4.3}$ | 5.8 mmole/l | | 8.7 mmole/l | |
| | PBTC | 2.5 mg/l | | 5 mg/l | |
| | load PBTC | 30 t/a | 47.5 t/a | 30 t/a | 47.5 t/a |
| | Accumulation of solids during precipitation | 240 t/a | 380 t/a | 120 t/a | 190 t/a |
| | load PBTC with 90% elimination | 3 t/a | 4.8 t/a | 3 t/a | 4.8 t/a |

|  |  | Water Type 2 | | | |
|---|---|---|---|---|---|
|  |  | Cycles of concentration | | | |
|  |  | 3 | | 5 | |
|  |  | Coal-fired power station | nuclear power station | Coal-fired power station | nuclear power station |
| I | with lime softening (prior art) | | | | |
|  | Make up water volume | 18 mil. m³/a | 28.5 mil. m³/a | 15 mil. m³/a | 24 mil. m³/a |
|  | Ca(OH)$_2$ demand | 1,600 t/a | 2,500 t/a | 1,300 t/a | 2,100 t/a |
|  | Accumulation of CaCO$_3$ solids | 4,300 t/a | 6,800 t/a | 3,600 t/a | 5,800 t/a |
|  | Cooling water: Content of: | | | | |
|  | Ca$^{2+}$ | | 0.9 mmole/l | | 1.5 mmole/l |
|  | K$_{S\,4.3}$ | | 1.5 mmole/l | | 2.5 mmole/l |
|  | PBTC | | 0.2 mmole/l | | 0.5 mg/l |
|  | load PBTC | 1.2 t/a | 1.9 t/a | 1.5 t/a | 2.5 t/a |
| II | with treatment of the blow down (invention) | | | Extra addition of 1 mmole/l H$_2$SO$_4$ to the added water | |
|  | blow down volume | 6 mil. m³/a | 9.5 mil. m³/a | 3 mil. m³/a | 5 mil. m³/a |
|  | Cooling water, content of: | | | | |
|  | Ca$^{2+}$ | | 4.5 mmole/l | | 7.5 mmole/l |
|  | K$_{S\,4.3}$ | | 8.7 mmole/l | | 9.5 mmole/l |
|  | PBTC | | 2.5 mg/l | | 5 mg/l |
|  | load PBTC | 15 t/a | 23.8 t/a | 15 t/a | 25 t/a |
|  | Accumulation of solids during precipitation | 60 t/a | 100 t/a | 60 t/a | 100 t/a |
|  | load PBTC with 90% elimination | 1.5 t/a | 2.4 t/a | 1.5 t/a | 2.5 t/a |

What is claimed is:

1. In a process for dissipating waste heat by cooling with water in an open recirculating cooling system wherein make up water is added to a cooling circuit the improvement comprising prior to the addition of the make up water to the cooling system, mechanically coarse-clarifying the make up water and then stabilizing the carbonate hardness of said make up water with scale inhibitors wherein said make up water is added to said cooling system without softening said make up water, and treating blow down water form said cooling system to remove said scale inhibitors from the blow down water.

2. A process in accordance with claim 1, wherein the scale inhibitors are phosphonates, phosphonocarboxylic acids and/or polycarboxylic acids.

3. A process in accordance with claim 1, wherein the scale inhibitor is 2-phosphonobutane-1,2,4-tricarboxylic acid.

4. A process in accordance with claim 1, wherein the scale inhibitors in the blow down are removed by flocculation or precipitation with iron and/or Al compounds or by adsorption on ion exchangers.

5. A process according to claim 1, wherein the heat dissipation is conducted in a thermal power station.

* * * * *